UNITED STATES PATENT OFFICE.

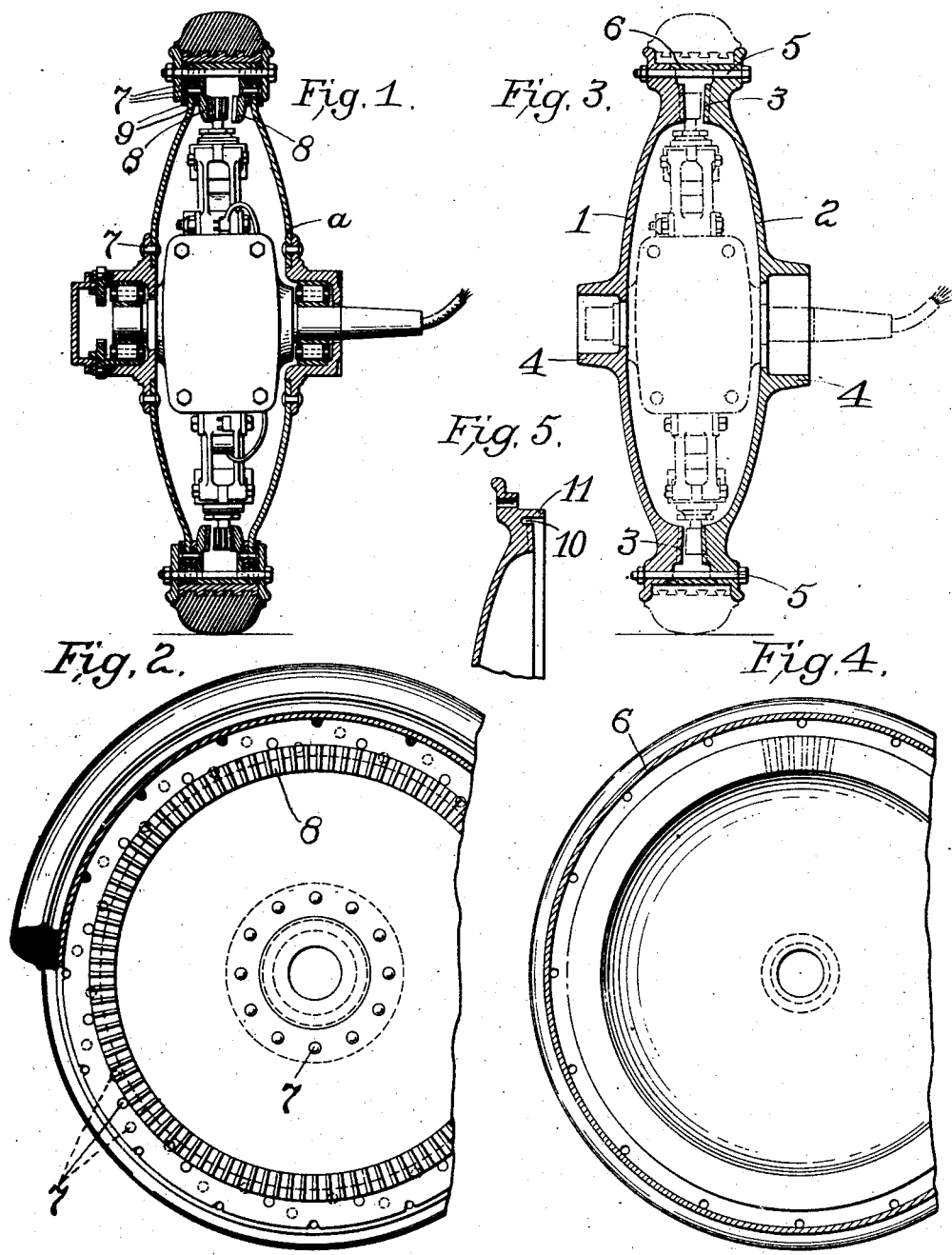

MELVIN B. CHURCH, OF GRAND RAPIDS, MICHIGAN.

MOTOR TRACTION-WHEEL.

1,090,684.  Specification of Letters Patent. Patente M r. 17, 1914.

Application filed June 30, 1913. Serial No. 776,735.

*To all whom it may conc..:*

Be it known that I, MELVIN B. CHURCH, citizen of the United States, residing at Grand Rapids, Michigan, have invented certain new and useful Improvements in Motor Traction-wheels, of which the following is a specification.

The object of this invention is to provide a traction power wheel with driving means inclosed, having a casing or sides to form the structure of the wheel with parts constituting a gear rack and hub all integral. The whole of such wheel sides and casing with gear rack blank or with teeth thereon acting as a supporting side.

Figure 1 shows the wheel as now in use and as patented in Patent 856,943 of Church and Knudsen; Fig. 2 shows an inside elevation of one of the disks as now built under said patent with its many drilled holes for rivets and bolts; Fig. 3 shows my new form with dotted outline of the motor and pinions as used in the old form, shown in Figs. 1 and 2; Fig. 4 shows the elevation or inside of the new form of integral disk and gear blanks without the rivets which are so dispensed with. Fig. 5 shows a section with a spacing ring formed integral with the disk.

Each side of the wheel is to be formed by casting, pressing, or drop forging, or similar method, hot or cold, from metal suitable for the purpose to which the wheel is to be put. A pair of side blanks with integral thickened portions are adapted to make up a hollow motor wheel structure to receive the driving parts and to resist the thrust of the electric or other motor and gearing when at work within the wheel, and also to hold annular gear racks in true parallel planes, or in other words, in planes parallel to each other throughout the circuit of the annular gear racks, and in proper meshing relation with the driving parts. The two sides 1 and 2 (see Fig. 3) when formed with thickened portions for the racks 3 and hubs 4 require some fitting or machining at the points where the axle bearings are to be placed, and where the two sides are to be joined together near the point where the gears are located. The wheel is then ready to receive its motor and parts to drive; the sides are then fastened together by bolts 5 near the rim, or at the point where the gear rack or blank is formed; a spacing ring 6 being provided to make room for the internal parts. This I have devised mainly to use in the structure now known as the coupler-gear truck wheel, which has an annular gear rack near the outer edge of its disk side driven by small bevel pinions, one at each end of an armature shaft which engages the gear rack directly; one at one side of the wheel and the other at the opposite side, and at opposite sides diametrically and in a slightly diagonal position in relation to the wheel disk and armature. Equalizing means is provided in the motor between the driving points as patented by Church and Knudsen 856,943. The equalizing device provides for considerable variation in pitch of teeth or variations in their shape in the rack and pinions, but does not prevent uneven meshing or bottoming of the teeth. The general form of this wheel has proved thoroughly practical in use, but it has been impossible to avoid considerable noise from the meshing of the steel pinions in the steel racks working at opposite sides within the wheel, and sometimes this is considerable, caused by the action of the pinions running at high speed. In the wheel referred to, in use, the reduction of the gearing is 25 to 1, and the driving power being thus applied direct to the rim of the wheel, necessitates high speed in the pinions and the use of a high speed electric motor in driving the slow vehicle. The drilling of many holes and the placing of many rivets 7, a number of rows of which are near the periphery of the sheet steel disks, (Figs. 1 and 2) and some of such rivets being also used to hold the casting to the center of the disk for the wheel bearings, necessitates the use in all of about 200 rivets in making each wheel. It was found very difficult to place the racks and pinions in the right relative position to insure proper meshing of the small teeth as the disks rotate and to hold them in that position in practice in heavy work. The plain sheet metal disks under such heavy strain sometimes spring at the center enough to cause uneven meshing. It was also difficult to avoid occasional mistakes in riveting and to avoid the loosening of the rivets in service, caused largely by the driving force of the motor applied between them. These rivets occasionally fall between the disk rack and the driving pinion, causing breakage and serious trouble, interruptions of service, etc. This difficulty has also been augmented in the springing of the gear rack rings 8 (see Fig. 1) which are made from cast steel, machined on all sides and then the teeth cut, and the rings drilled for rivets. When this process is going on, and sometimes after finished and apparently true, these gear rings have been found to spring or to draw themselves out of true. When the reinforcing rings 9 and gears 8 were all riveted to the edge of the disk and put into use it was sometimes found that this unevenness at the rim caused the center of the disk to spring at $a$, while at work, and this contributed to produce excessive noise in practice; and when this difficulty was found after the wheel was so completely formed, and in use, it was impossible to remedy the difficulty without rebuilding one or both of the sides, with its parts, entirely.

Referring to Fig. 5, at 10, space is left between the gear blank and the spacing ring 11 which will be needed, where means is available to cut the bevel teeth from the inside outwardly; and where the teeth are to be cast or pressed in the blank in forming the integral side. In cases where the teeth are to be so formed integral by pressing or casting it will be necessary to dress them out or smooth them in some way and this I propose to do in the following manner: When the teeth are made nearly perfect by such casting or stamping they may be dressed or smoothed by merely assembling the wheel with its motor and pinions in place, and running the same long enough to grind and polish the surface, and in such case I may use hardened steel or carborundum pinions to act against the soft steel rack which is usually used, and to facilitate this grinding I dispense with the evener action so that the teeth may have the usual sliding motion found in the meshing of all gears prior to the invention described in the Patent 856943. This grinding method does not form any part of my present invention, but is merely described here to suggest a means for perfecting the teeth when formed in casting or pressing the integral side; which method may be the subject matter for a later application. This equalizing action referred to, does not assist at all to avoid excessive noise from the uneven shape of the disk or gear rings as found in the form in use at present, described above, as its action is only with the rolling motion and has no effect to avoid the bottoming of the teeth as the pinions are fixed in rigid bearings so that no side movement can occur as the disk draws nearer or leaves the pinions, so revolving unevenly.

For the grinding, above described, of very uneven teeth to form them perfectly, I have the pinions formed direct upon both ends of a solid shaft without the equalizer as explained, and this being without the armature can be run safely at a very high speed by driving the wheel instead of the pinions. In the present couple gear wheel referred to, the reduction is 25 to 1, therefore when the grinding of this wheel is to be performed, if I can drive the wheel say one thousand revolutions per minute when the pinion speed will be 25000 R. P. M. and there being two pinions on the same shaft the opposite disk rack gets the same, 25000 R. P. M. to grind its teeth.

In many cases the teeth of the gear rack will be formed in the blank of the integral side by cutting with a milling machine or by any suitable method as is done in regular practice in cutting bevel gear racks.

Where I refer to side blanks I do not mean to limit the application of these terms to mean the whole side of the wheel as the side blanks may be combined with extensions or spokes out beyond the side blanks and gear rack.

I claim as my invention:—

1. A hollow wheel having sides, each with an annular rack on its inner face, and driving connections within the wheel geared to said racks, each of said sides having integral therewith an annular thickened portion at the rack and an integral thickened hub portion to hold said racks in parallel planes and the driving connections in proper working relation thereto.

2. A hollow motor wheel having inclosing sides with an annular thickened portion integral with and on the inner face of each side and a thickened hub portion integral with each side, a rack on each annular thickened portion, a motor supported between the hubs of the sides and a transmitting connection between the motor and racks, said annular thickened portion and said thickened hub portions holding the motor, transmission connection, and annular racks in proper working relation, substantially as described.

3. A hollow wheel having a side with an annular rack on its inner face and driving connections within the wheel geared to said rack, said side having integral therewith an annular thickened portion at the rack and an integral thickened hub portion to hold said rack and driving connections in proper working relation, substantially as described.

4. A hollow wheel having a side with an annular integral thickened portion on its inner face provided with rack teeth integral with said thickened portion, said side having also an integral thickened hub portion, driving connections within the wheel geared to the rack, said thickened portions holding the rack and driving connections in proper working relation, substantially as described.

5. A hollow wheel having a side with an annular rack on its inner face, driving connections within the wheel geared to said rack, said side having integral therewith an annular thickened portion at the rack to hold the said rack and driving connections in proper working relation, substantially as described.

6. A hollow wheel having a side provided with an annular rack and an integral thickened portion for the rack and an integral extension beyond the rack to support the tread, substantially as described.

7. A hollow motor wheel having a side with a rack and an integral thickened portion at the rack and an integral spacing flange spaced apart from said rack, substantially as described.

8. A hollow wheel having two sides, each side having integral hub portions, and an annular gear rack near the periphery integral with its supporting side, the two sides supporting driving means between them extending from the axial center and connected with said annular gear rack at opposite sides thereof.

In testimony whereof, I affix my signature in presence of two witnesses.

MELVIN B. CHURCH.

Witnesses:
H. L. ALDEN,
BENNETT S. JONES.

Copies of this patent may be obtained for five cents each, by addressing the "Commissioner of Patents, Washington, D. C."